Aug. 4, 1964 W. I. CARLSON 3,142,949
BEAN PICKER
Filed May 15, 1961 5 Sheets-Sheet 1

Fig. 1.

INVENTOR.
Wyman I. Carlson
BY
Popp and Sommer
Attorneys

Aug. 4, 1964 W. I. CARLSON 3,142,949
BEAN PICKER
Filed May 15, 1961 5 Sheets-Sheet 3

Fig. 3.

INVENTOR.
Wyman I. Carlson
BY
Popp and Sommer
Attorneys ved Aug. 4, 1964

3,142,949
BEAN PICKER
Wyman I. Carlson, Lewiston, N.Y., assignor to Chisholm-Ryder Company, Inc., Niagara Falls, N.Y., a corporation of New York
Filed May 15, 1961, Ser. No. 109,967
2 Claims. (Cl. 56—19)

This invention relates to a bean picker and more particularly to a machine for picking dry or mature bean pods and bean seeds from ripe bushes in the field although features of the invention can also be advantageously employed in harvesting snap or string beans.

The harvesting of dry or mature beans has presented special problems due both to the season in which they are harvested and to the ease with which the mature pods burst open and release the bean seeds as well as the difficulty in garnering and recovering the round and slippery bean seeds when so released.

In the harvesting of dry beans it is now common practice to gather the ripe plants into windrows. This operation of itself involves the loss of bean seeds due to the natural tendency of the mature pods to burst in handling and release bean seeds to fall on the ground. In the event the windrows are not picked up before a rain, the windrows are turned over to dry the plants out, this again involving more burst pods and a further loss of bean seeds. If not turned over fermentation of the plants can take place and while the bean seeds are not fermented, they can be adversely affected by fermentation of the leaves of the plants. Loading the windrowed plants onto a loader and into the thresher involves further bursting of mature pods and release of the bean seeds which are extremely fugitive due to their round and shiny and hence slippery surface. Once confined in a thresher, the dry beans present no special problem, the natural tendency of the bean pods to burst open, in fact, facilitating the threshing operation.

It is the principal object of the present invention to provide a machine for picking dry or mature bean pods and seeds from ripe plants in the field with maximum yield of dry bean pods and seeds and minimum loss, particularly of bean seeds released from the pods under impact.

Another object is to provide such a machine which does not require any gathering or windrowing of the bean plant but which operates in a normally cultivated field of bean plants as soon as they have reached maturity.

Another object is to provide such a machine which travels rapidly along two rows of ripe bean plants and effectively removes the pods and bean seeds therefrom, leaving the plants in the field to be plowed under to add humus to the soil.

Another object is to provide such a machine which is not limited to operation only in favorable weather and which will operate on plants which are wet or dry.

Another object is to provide such a machine which does not require a high degree of skill to operate, particularly in following the rows of bean plants in the field.

Another object is to provide such a machine which is rugged in construction and not subject to breakdown or other interference with its operation.

Another object is to provide a simple and effective form of picking tines which yield on encountering immobile objects.

Other objects and advantages of the invention will be apparent from the following description and drawings in which.

The present invention is illustrated in conjunction with the form of bean picker forming the subject of the Ward Patent No. 2,675,663 dated April 20, 1954 to which reference is made for features such as leaf and stem separation and bagging not illustrated in this application.

For convenience in understanding the invention, the center lines of the two rows of bean plants to be harvested are designated by the letter C. The dry bean harvester is also propelled along these rows of bean plants by a conventional farm tractor T shown by dot-dash lines in FIGS. 1 and 2. This tractor is shown as having the conventional frame F, rear driving wheels W, front steering wheels w, motor M and seat S. Particularly associated with the present invention are two manual hydraulic control levers L and L' which control, respectively, the movement of a pair of lifting arms 13 and 14 on opposite sides of the tractor and each of which is fast to a corresponding cross shaft 15, 16 which is journalled in the tractor frame F. The upper free end of each lifting arm 13 is apertured to connect with a lifting chain and the upper free end of each lifting arm 14 is apertured to connect with a lifting push rod as hereinafter described. Also, particularly associated with the present invention is a power take-off 17 secured to the tractor frame by suitable brackets and carrying and driving a transverse drive shaft 18 from which power for operation of the harvester is derived.

At each side of the tractor a lifting bell crank lever 19 is mounted on the housing for the power take-off 17 concentric with a shaft 18, one arm 20 of each bell crank lever projecting upwardly and being apertured to receive an intermediate part of a pull chain 21 one end of which is connected to the upper free end of the corresponding hydraulic lifting arm 13 and the other end of which is secured through a helical tension spring 22 to a bracket 23 secured to the corresponding side of the frame F of the tractor.

Each bell crank lever 19 has a second arm 24 projecting rearwardly with reference to the line of movement of the harvester and the free ends of these arms 24 are pivotally secured to the opposite sides of an elevator housing 25 concentric with a transverse jack shaft 26 journalled in this housing. The elevator mechanism contained within this housing 25 forms no part of the present invention and hence the upper part of this elevator housing and elevator mechanism therein is not illustrated. This jack shaft 26 is driven from the power take-off shaft 18 by a chain and sprocket drive 27, 28 and the other powered components are driven from this jack shaft as hereinafter described.

Figure 1:
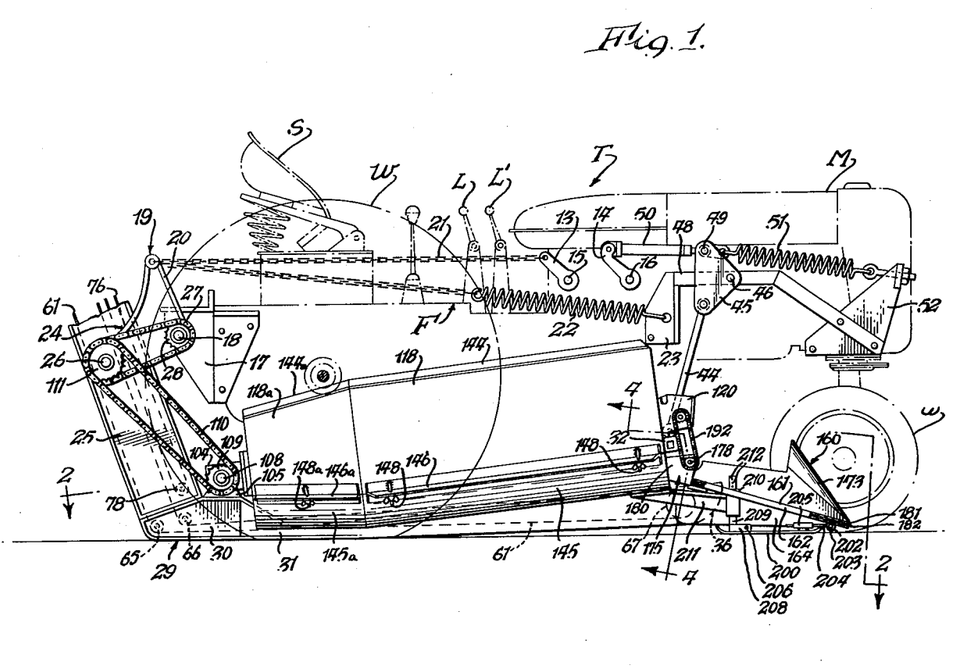
FIG. 1 is a fragmentary side elevational view of a dry bean harvester embodying the present invention and showing the same as applied to a conventional farm tractor which is shown in dot-dash lines.
Figure 2:
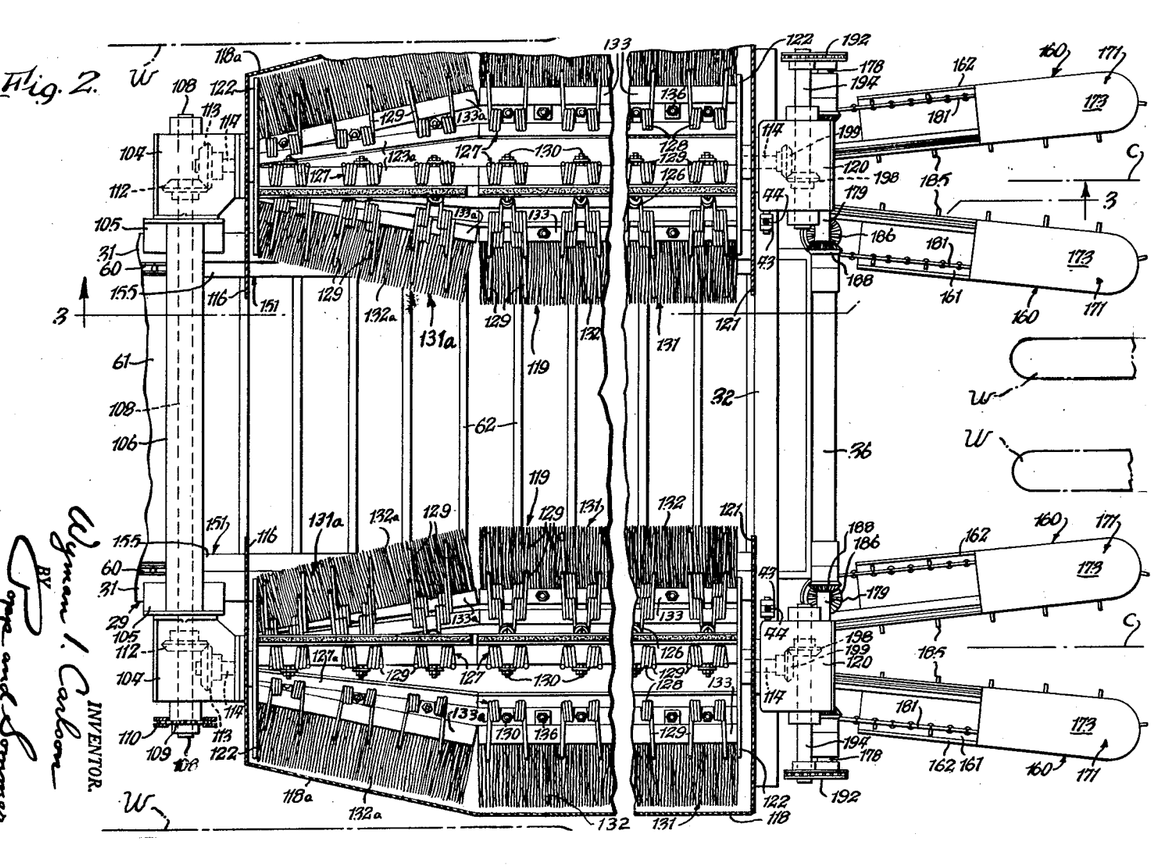
FIG. 2 is a fragmentary horizontal section taken generally on line 2—2, FIG. 1, with parts broken away.
Figure 3:
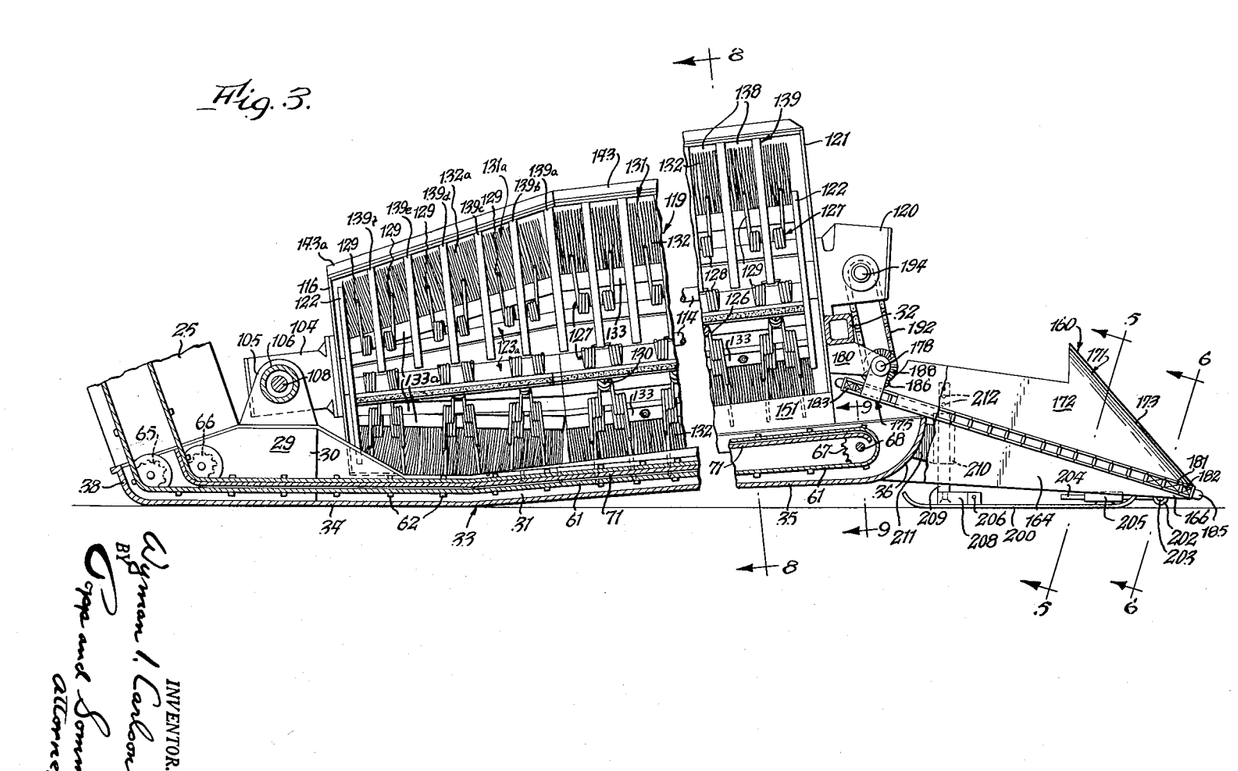
FIG. 3 is a vertical longitudinal section taken generally on line 3—3, FIG. 2 and showing part of the mechanism broken away.
Figure 8:
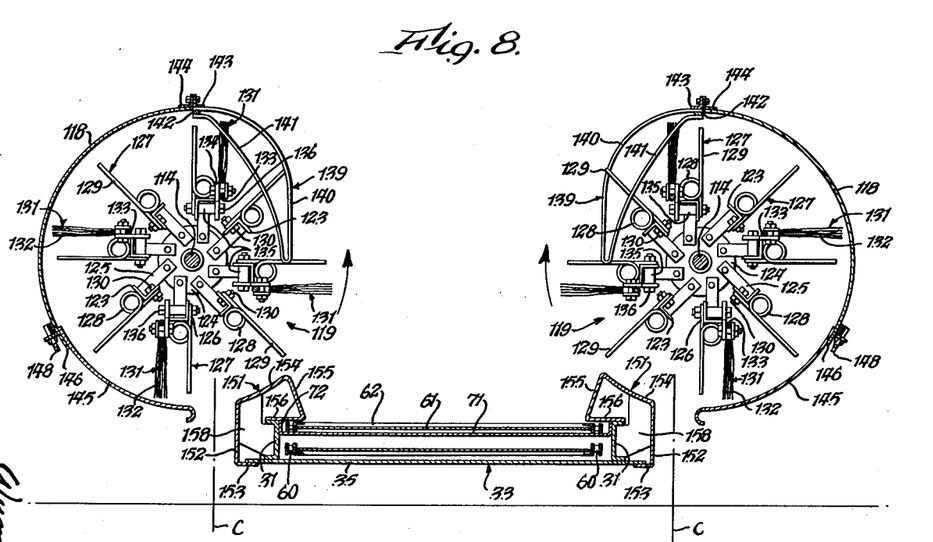
FIG. 8 is a vertical section taken along line 8—8, FIG. 3 and showing the reels and main endless slatted conveyor belt in section.

The elevator housing 25, of which the lower part only is illustrated, forms a part of the adjustable frame of the harvester and is rectangular in cross section to enclose the upwardly extending stretches of an endless belt conveyor. The lower end of this housing 25 is fast to a base 29, the vertical side walls 30 of which are fast to channels 31 which project forward from these side walls 30 and are arranged on opposite sides of the harvester. As shown in FIGS. 1–3, the front ends of the channels 31 are rigidly connected by a bar 32 which is preferably tubular and square in cross section and which forms the front cross bar of the harvester frame. The channels or side frame bars 31 are also connected by a metal bottom plate 33 which, as best shown in FIG. 8, is secured to the undersides of the side bars 31 and projects laterally a short distance therefrom. This bottom plate 33 travels close to the ground, its rear end 34, as best shown in FIG. 3, being arranged substantially parallel with the ground while its forward end 35 inclines forwardly and upwardly at a slight angle. Also, as shown in FIG. 3, the extreme forward end 36 curves upwardly to provide a scow-like prow and the rear end 34 thereof extends under the base 29 of the elevator housing and curves upwardly as indicated at 38, to join the rear wall of the housing.

As best shown in FIG. 2, the tubular cross bar 32 is provided near its opposite ends with a pair of upstanding ears 43, to which is pivatally connected the lower end of a lifting link 44. As best shown in FIG. 1, the upper end of each of the links 44 connects with a triangular plate 45 which forms in effect another bell crank lever which is pivoted at 46 to a bracket 48 secured to the tractor frame F. The third or upper pivot 49 of each triangular plate 45 is connected by a push rod or link 50 with the free end of the hydraulically actuated lifting arm 14. The pivot 49 also connects with a helical tension spring 51, the forward end of which is anchored to a bracket 52 carried by the frame F of the tractor.

The hand lever L hydraulically controls the arms 13, and it will be seen that when these arms 13 are actuated to rotate clockwise, as viewed in FIG. 1, tension is imposed on the chains 21 to rotate the bell crank levers 19 clockwise and lift their lower arms 24. Since each lower arm 24 is pivotally connected with the rear end of the frame of the harvester, this serves to lift the rear end of the harvester frame to an elevation to suit the condition of the beam plants being picked. At the same time, since the drive chain 27 passes around sprockets concentric with the shafts 18 and 26 supporting and supported by respectively, the two bell crank levers 19, the power drive from the tractor T to the harvester is not interfered with by such adjustment of the rear end of the harvester frame. The hand lever L' hydraulically controls the arms 14, as viewed in FIG. 1, pushes on the rods 50 to rotate the triangular plates 45 clockwise about their pivots 46, thereby lifting the rods 44 which support the front tubular cross bar 32 of the harvester frame, the front end of the harvester being thereby elevated to suit the condition of the bean plants being picked. It will also be noted that each pair of helical tension springs 22 and 51 serve to yieldingly support the corresponding ends of the harvester frame.

Figure 9:
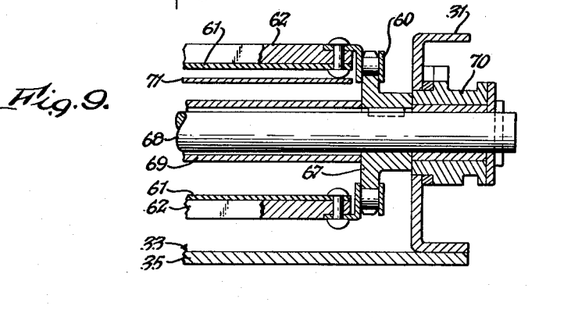
FIG. 9 is an enlarged vertical section taken along line 9—9, FIG. 3 and showing, in section, the sprocket for the forward end of the main endless slatted conveyor belt for the harvester.

The threshed dry beans and pods, together with leaves, stems and trash, are received and conveyed to and up the elevator housing 25 by an endless conveyor shown as being in the form of drive chains 60 severally fast to each side edge of an endless belt 61 preferably made of rubberized cloth and provided on its working face with a succession of transverse slats 62. The drive chains 60 along the opposite edges of the conveyor belt 61 can be of any suitable form and are preferably secured to the opposite ends of the slats 62 in any suitable manner, such as by the rivets shown in FIG. 9. This conveyer belt 61 receives the threshed beans and bean pods, as well as leaves and stems that are removed from the bean plants, and delivers them to and elevates them through the elevator housing 25 for further processing. For this purpose, the conveyer chains are shown as travelling around two pairs of idler sprockets 65 and 66 journalled in the base 29 of the elevator housing 25 and which provide an upwardly and downwardly moving stretch of the conveyer in the elevator housing 25.

The path of travel of the conveyer 61 is completed by a pair of idler sprockets 67 located alongside the inner or opposing faces of the frame side bars or channels 31 immediately in rear of the upturned prow 36 of the bottom plate 33. These sprockets 67 provide a generally horizontal stretch of the conveyor 61 which, as best shown in FIGS. 3 and 8, extends transversely between the side bars 31 and travels parallel with the bottom plate 33 from the front 36 to the rear 38 thereof. The pair of sprockets 67 can be supported in the manner shown in FIG. 9, where they are shown as keyed to a cross shaft 68 and held in spaced relation by a spacer tube 69. The shaft 68 is shown as journalled in bearings 70 secured to the forward ends of the side bars 31. To prevent sagging of the horizontal upper stretch of the conveyor 61, it and the corresponding parts of the drive chains 60 can be supported by a sheet metal pan 71 having upturned edges 72 secured to the frame side bars 31, as best shown in FIG. 8.

As best shown in FIG. 1, the pods and trash are supported for upward movement along the generally vertical elevator stretch of the conveyor 61 by an endless idler belt 76, the lower end of which passes around a transverse idler roller 78 journalled in the lower end of the elevator housing 25. The rear stretch of this idler belt 76 is in parallel, face-to-face, spaced relation to the corresponding stretch of the conveyor 61 so that bean pods and trash entering the space between these stretches are held in engagement with these stretches and conveyed upwardly to be discharged.

As best shown in FIGS. 2 and 3, a gear case 104 is mounted on each sidewall 30 of the base section 29 of the elevator by brackets 105, these brackets being connected by a cross tube 106. These gear cases journal a cross shaft 108 having a sprocket 109 fast to one projecting end. The sprocket 109 is connected by a chain 110, as shown in FIG. 1, with a sprocket 111 fast to the corresponding end of the jack shaft 26.

Within each gear case 104, the cross shaft 108 carries a bevel gear 112 which meshes with a bevel gear 113 fast to a longitudinal picker shaft 114. As best shown in FIG. 2, the picker shafts 114 are arranged outside of and above and generally parallel with the side bars 31 of the harvester frame. The rear ends of the picker shafts 114 extend from and are journalled in the corresponding gear cases 104 which support the rear end plate 116 of a semicylindrical cover or enclosure 118, having a conical end 118a, of a rotary picking mechanism, indicated generally at 119, carried by the corresponding picker shaft 114.

The forward end of each of the picker shafts 114 is journalled, as best shown in FIG. 2, in a bearing of a gear case 120. Each of these gear cases is secured to the front end plate 121 of the semicylindrical cover or enclosure 118, 118a of the corresponding picking mechanism 119, and this front end plate 121 is in turn secured to the tubular front cross bar 32 of the harvester frame.

Each of the rotary picking mechanisms 119 operates on a single row of bean plants, and is provided with rod-like picking tines which enter the bean plants, sever the bean pods therefrom, and deposit the pods on the upper horizontal stretch of the conveyer 61. In addition to these rod-like picking tines, each rotary picking mechanism is also provided with a radially projecting brush behind every alternate row of the tines, these brushes being a feature of the invention in the successful harvesting of ripe or dry beans and in particular in directing free individual bean seeds toward the conveyer belt 61 and in confining the movement of such free individual bean seeds to the space between the two rotary picking mechanisms 119 so that they ultimately fall onto the conveyer 61 to be recovered.

For this purpose each of the shafts 114 of each rotary picking mechanism 119 has a disk-like end head 122 fixed to each of its ends, and these end heads support an annular series of angle irons 123 which are arranged parallel with and equidistant from the shaft 114 but terminate short of the rear end of the shaft 114. These angle irons are shown as being eight in number. These angle irons are arranged to have one face disposed radially with respect to the shaft 114, and at their centers are shown as additionally supported from a disk 124, fast to the center of the shaft 114, by bars 125 fixed to the center of each angle iron and bolted to the disk 124. To each radial face of each angle iron 123 is secured, as hereinafter described, the base or attaching ear portions 126 of picking tines 127. These picking tines are each made of spring wire and the base or attaching end 126 is in the form of a loop adapted to be bolted to the angle iron 123 and each loop forms a continuation of one end of a helical coil spring 128 arranged parallel with the supporting angle iron 123. The opposite end of each helical coil is continued in the form of a radially projecting finger 129 which projects a substantial distance from its angle iron 123 to enter the ripe bean plants and thresh the ripe pods and bean seeds therefrom.

The tines 127 are preferably spaced in regular order along each of the angle irons 123 and are secured to these angle irons by short bolts 130 which pass through the base or attaching loops 126 of these tines and through the angle irons 123 as best shown in FIG. 8. However, a feature of the invention resides in the provision of radially projecting brushes 131 behind certain of these tines. These brushes are shown as being behind the tines of every alternate angle iron 123 and as each comprising bristles 132 of nylon or the like projecting from a flat base 133 extending the full length of its angle iron 123 and secured by, as by bolts, to plates 134, these plates being secured against the ends of spacing sleeves on collars 135 by bolts 136, these bolts also passing through and securing the bases or attaching loops 126 of the companion tines 127.

A feature of the invention resides in the rear end of each rotary picking mechanism 119 being formed to sweep close to and parallel with the ground so as to recover pods or individual bean seeds that otherwise would be lost. For this purpose, the ends of the tines and brushes at the rear ends of each rotary picking mechanism define a frustum of a cone the bottom part of the periphery of which is parallel with and close to the ground. For this purpose, the rearward ends of the several angle irons 123 are continued with angle irons 123a which converge rearwardly toward one another. The rearward ends of these angle irons 123a are suitably secured to the rear disk 122 of the shaft 114 and these angle irons jointly define a conical frustum the bottom longitudinal line of which is parallel with the ground.

Each of these converging angle irons carries a series of picking tines 127 identical with and mounted in the same manner as the picking tines 127 on the angle irons 123 but since the angle irons 123a converge, the outer ends of the picking tines on the angle irons 123a also converge to form a conical frustum which sweeps close to the ground. Brushes 131a, of shorter length than the brushes 131, have bases 133a forming rearward continuations of the bases 133a of the latter and are arranged parallel with the angle iron 123a so that their bristles 132a are of frusto-conical form and sweep close to the ground. Since except for their angular arrangement and length the brushes 131a are identical with and mounted in the same manner as the brushes 131, the detailed description of these brushes 131a and their mounting will not be repeated, the same reference numerals being employed and distinguished by the suffix "a."

The picking tines 127 enter the bean plants from the outside of the two rows being harvested, and travel upwardly to strip the bean pods therefrom and to deposit them, together with the free bean seeds released from the ripe pods, on the horizontal upper stretch of the conveyor 61. To clear the tines 127 of any clinging debris as they leave the plants, the tines pass through spaces or slots 138 between arcuate bars or strips 139 which are arranged in the manner of a comb to so clear the tines of any debris. For strength each of the arcuate bars 139 comprises an outer arcuate portion 140 and an inner arcuate portion 141 forming a continuation of the outboard end of the outer arcuate portion, these arcuate portions being shown as welded to a common bar 142 at their inboard ends and being welded to one of two angle irons 143, 144 secured at one end to the stationary end plate 121 and which also serve as the upper supporting bars for the semicylindrical cover or enclosure 118 and having angularly disposed end extensions 143a and 144a which are secured to the stationary end plate 116 and support the frusto-conical extension 118a of this cover. Within this frusto-conical extension 118a the arcuate bars, designated at 139a, 139b etc., are of diminishing size and distance from the shaft 114 to conform to the diminishing length of the fingers 129a, 129b, etc., of the picking tines 127. The outboard ends of the arcuate bars 139 project downwardly among the rising tines 127 and are arranged so that these tines withdraw through the spaces or slots 138 between these arcuate bars as the tines move upwardly, thereby to strip any debris adhering to these tines.

Each semicylindrical cover 118 is completed, on the outside of the harvester, to a vertical plane intersecting the axis of the corresponding picker shaft 114, by an arcuate enclosure or cover plate 145, conforming to the curvature of the cover 118 and engaging the stationary end head or disk 121. An angle bar 146 is welded to the upper edge of cover plate 145, and, as best shown in FIG. 8, this angle bar is secured to stud bolts 148 projecting from the lower edge of the semicylindrical cover 118. Similarly each frusto-conical cover 118a is completed, on the outside of the harvester, to a vertical plane intersecting the axis of the corresponding picker shaft 114, by a frusto-conical cover or enclosure plate 145a, conforming to the curvature of the cover section 118a and engaging the stationary end head or disk 116. Similarly, an angle bar 146a is welded to the upper edge of the cover plate 145a, and this angle bar is secured to stud bolts 148a projecting from the lower edge of the semicylindrical cover section 118a.

The bean plants are preferably supported in a bent over position while being acted upon by the picking tines 127 and brushes 131 and for this purpose the opposing sides of the two rows of bean plants being harvested are held against and travel along a horizontally elongated abutment or mold board 151 secured to each of the frame side bars 31 along the picking zone. Each of the mold boards 151, as best shown in FIG. 8, has a vertical wall 152 arranged in spaced relation to the lower edge of the lower cover or enclosure sections 145, 145a to permit the bean plants to pass therebetween. The vertical wall 152 terminates in a bottom inturned longitudinal flange 153 which is secured at intervals to the underside of the bottom plate 33 at the side edge thereof. The upper edge of the vertical wall 152 terminates in an arcuate concave wall 154 which forms a continuation of this vertical wall and extends inwardly therefrom in concentric relation with the picker shaft 114. This mold board 151 preferably extends the full length of the picking tines 127 and brushes 131 and is formed so that these picking tines and brushes sweep in close relation to the concave parts 154 of these mold boards 151. The upper edge of each arcuate wall 154 terminates in a downwardly and inwardly inclined wall 155 which forms a continuation thereof and which extends over and houses the corresponding side chain 60 of the conveyor 61. The lower edge of each of these inclined walls 155 terminates in a flange 156 which rests on and is secured to the corresponding side bar 31 of the harvester frame. At intervals the mold boards 151 can be reinforced by internal transverse plates 158 welded at their tops and outer sides to the arcuate and vertical walls 154 and 152, respectively, and fitting in the channels of the side bars 31.

The mold boards 151 are not of uniform size in cross section, but diminish toward the rear of the harvester to conform to the upward and forward inclination of the picker shafts 114 and the picking tines 127 and brushes 131 carried thereby and also conform to the frusto-conical form of these tines and brushes at the rear end of the harvester.

Figure 5:
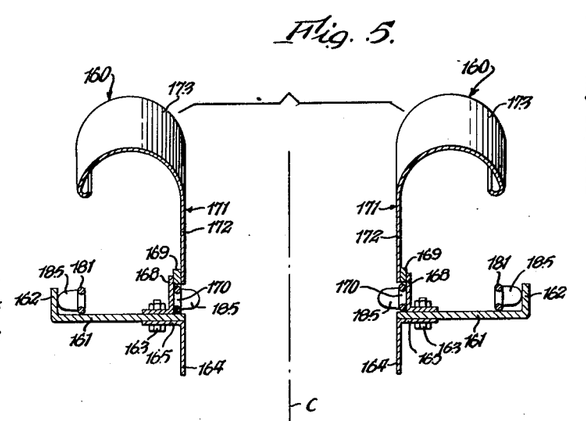
FIG. 5 is an enlarged vertical section taken generally along line 5—5, FIG. 3 and showing the gathering apron and chains in section.
Figures 6, 7:
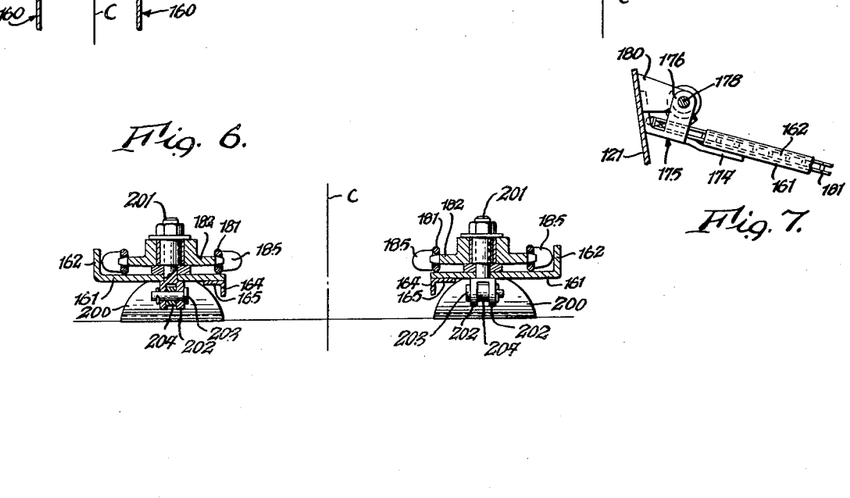
FIG. 6 is an enlarged vertical section taken along line 6—6, FIG. 3 and showing the foremost sprocket wheels for the gathering chains and also the skids at the forward end of each gathering apron.
FIG. 7 is a diminutive vertical section taken on line 7—7, FIG. 4.

The bean plants of each row are gathered at each side of the harvester by a pair of gathering aprons indicated generally at 160. As best shown in FIGS. 5 and 7, each gathering apron 160 comprises a bar 161 which is L-shaped in cross section, having an upstanding guide flange 162 along its edge remote from the row of beans. Bolted, as at 163, to the underside of this bar along the edge thereof adjacent the row of bean plants is a lower apron 164, this lower apron having an upper attaching flange 165 through which bolts 163 extend. The lower apron 164 is in the form of a vertical flat plate that diminishes in height toward its front end to form a forward pointed end 166, as best shown in FIG. 3.

Secured by the same bolts 163 to the bar 161 is an angle iron 168 to the upper part of which, on the side facing the bean plants, is secured a spacing strip 169 to form a guideway 170 extending longitudinally of the bar 161. Secured to the inner face of the spacing strip 169 is an upper apron 171 which has a planar vertical part 172 extending upwardly from the spacing strip 169 and an upper outwardly curving edge 173 which supports the branches of the bean plants. As best shown in FIGS. 1 and 3, this curving edge 173 extends abruptly upwardly and rearwardly from the pointed forward extremity 166 of the gathering apron, this upper curving edge thereby serving to elevate sprawling branches of the bean plants and bring the bean plants to an erect position.

Figure 4:
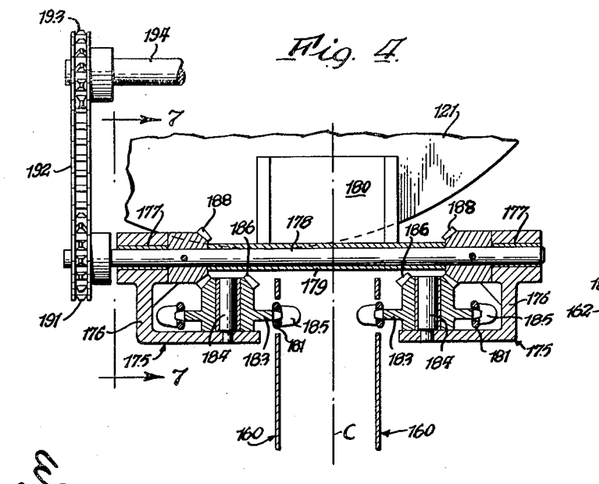
FIG. 4 is an enlarged vertical section taken generally along line 4—4, FIG. 1 and showing the drive to the gathering chains.

As best shown in FIG. 7, the rear end of each of the bars 161 rests on and is suitably secured to the forwardly extending tongue or extension 174 of a supporting bracket 175. As best shown in FIG. 4, the bracket 175 is L-shaped in cross section, having a base flange forming a continuation of the bar 161 and an upstanding flange 176 on the side thereof remote from the bean plants. The upstanding flange 176 of each bracket 175 has a bearing 177 journalled on a corresponding cross shaft 178. Each cross shaft 178 is in turn journalled in a bearing 179 of a bracket 180 attached to the front face of the front stationary disk 121 of the housing for the corresponding picking mechanism. It will therefore be seen that the gathering aprons 160 of each pair are pivotally mounted at their rear ends on the cross shaft 178 so that their front ends are free to rise and fall. The space between the pair of gathering aprons 160 at each side of the machine alines, of course, with the space between the corresponding mold board 151 and the lower edge of the housing plate 145, 145a for the corresponding picking mechanism 119, so that the bean plants gathered by the gathering aprons 160 are led with their branches raised into the spaces between the mold boards 151 and lower edges of the side plates 145, 145a.

The lifting of the branches of the bean plants between each pair of gathering aprons is facilitated by chains 181, the bean plant engaging stretch of each of which passes along the guideways 170 formed by the spacer bars 169, and the other stretch of which rides on the L-shaped bar 161 adjacent the upstanding flange 162 thereof. At its lower end each of these chains 181 passes around an idler sprocket 182 mounted on the lower end of the corresponding bar 161, while the upper end of each of these chains passes around a drive sprocket 183 journalled on an upstanding pin 184 on the base flange of the bracket 175. Each gathering chain is preferably provided with suitable knobs 185 to insure gathering of the branches of the bean plants.

As best shown in FIGS. 2 and 4, each sprocket 183 is formed integrally with a miter gear 186 which meshes with a miter gear 188 fast to the cross shaft 178 which serves the pair of chains 181 at each side of the harvester. A sprocket 191 is fast to the outer end of each cross shaft 178, this being connected by a drive chain 192 with a sprocket 193 fast to the outer end of a cross shaft 194. As best shown in FIG. 2, each of the cross shafts 194 is journalled in a gear box 120. Inside of each gear box 120, a miter gear 198 is fast to the cross shaft 194 and meshes with a miter gear 199 fast to the end of the corresponding picker shaft 114.

Each apron 160 is provided with a ground-engaging shoe or skid 200, best shown in FIGS. 3 and 6, which serves to support the apron and also permits it to follow the contour of the ground. Each skid 200 extends lengthwise of the apron and is provided with upturned front and rear ends. At its forward end, each of these shoes is jointedly connected with the pin 201 on which the front idler sprocket 182 of the corresponding gathering chain 181 is mounted. As shown in FIG. 6, the pin 201 is provided at its lower end with a pair of downwardly projecting ears 202 between which is pivoted, as by a cross pin 203, the front end of a rearwardly projecting rod 204. As shown in FIG. 3, each rod 204 extends through a horizontal sleeve 205 fast to the forward end of the corresponding shoe 200. It will be seen that the forward end of each shoe 200 is free to pivot about its horizontal pivot pin 203 and also free to slide fore-and-aft along its rod 204. The rear of each shoe 200 is provided with a transverse pivot pin 206 to which an arm 208 is pivotally connected. On the rear end of the arm 208 is rigidly mounted an upstanding rod 209. The rod 209 slides in a vertical sleeve 210 at the forward end of a bracket 211 secured to the underside of the lower cover or enclosing section 145 as shown in FIG. 1. The upper end of each upstanding rod 209 is provided with a series of transverse holes 212 through which a retaining pin can be passed to limit the downward movement of the rod, each of these rods 209, and hence the rear end of each shoe 200, being free to move upwardly.

*Power Flow*

The power flow from the power take-off 17 of the tractor T to the various rotating components of the harvester is as follows:

The shaft 18 of the power take-off (FIG. 1) through the chain 27 drives the jack shaft 26 journalled in the elevator housing 25 forming part of the adjustable frame of the harvester. Through the sprocket 111, chain 110 and sprocket 109, this jack shaft drives the cross shaft 108. Through the two sets of miter gears 112 and 113 (FIG. 2), the cross shaft 108 drives each of the picker shafts 114 which extend forwardly along opposite sides of the tractor. The picker shafts 114 rotate the picking mechanisms 119 so as to rotate the picking tines 127 in the directions indicated by the large arrows shown in FIG. 8. Through the miter gears 199 and 198 in each of the gear cases 120 (FIG. 2), the rotation of the picker shafts 114 rotates each of the short cross shafts 194. Through the sprockets 193 and chains 192, the shafts 194 drive the sprockets 191 (FIG. 4) on each of the short cross shafts 178. Through the miter gears 188 and 186, each of the cross shafts 178 drives the corresponding pair of sprockets 183 which mesh with the corresponding gathering chains 181. One of these gathering chains 181 is associated with each of the four gathering aprons 160, the lower ends of these chains passing around the sprockets 182 (FIGS. 3 and 6), and the knobs 185 on these chains traveling upwardly and rearwardly along the opposite sides of these gathering aprons (FIGS. 2 and 3) to assist these gathering aprons in lifting the branches of the bean plants.

The bean pods and trash deposited on the horizontal upper stretch of the conveyor 61 are carried upward by the elevating stretch into engagement with the rear stretch of the idler belt 76 and thus drive this stretch of the idler belt upwardly. The idler belt 76 travels around the roller 78. The idler belt 76 and elevating stretch of the conveyor 61 can deliver the pods and free bean seeds, as well as any leaves, stems and trash mixed therewith, to a suitable cleaning and bagging or boxing mechanism, such forming no part of the present invention and thence not being shown.

*Operation*

The tractor T with the harvester forming the subject of the present invention attached thereto is propelled along the two rows of ripe or dry bean plants to be harvested, the centerlines of these rows being designated by the letter C. As best shown in FIG. 2, the tractor T is guided so that these two rows of beans aline with the spaces between the two pairs of gathering aprons 160 at each side of the harvester, which aprons are pivoted at their rear ends on the cross shafts 178 (FIGS. 3, 4 and 7) and are supported at their front ends by the ground-engaging shoes 200 (FIG. 3). Referring to FIGS. 1 and 3, it will be seen that the upper parts 173 of each pair of these aprons curl outwardly away from the row of beans received therebetween and that these curving parts are arranged at a steep angle, sloping downwardly and forwardly toward the pointed ends of these aprons which travel close to the ground. Accordingly, these pointed forward ends of the aprons move close to the ground under the prostrate branches of the bean plants, and as the aprons travel forwardly these branches are lifted so as to bring each bean plant to an erect position.

In order to hold the bean plants in such erect position while traveling rearwardly between the pairs of aprons 160, and to overcome the friction of these aprons in so lifting the branches of the bean plants, the pairs of gathering chains 181 are associated with these aprons, these chains being arranged at the angle indicated at FIG. 3 and each having its operative stretch traveling in the guideway 170 (FIG. 5) provided in each of these gathering aprons, each chain being provided with the knobs 185 which project from the face of the apron along which the bean plants travel so as to interengage with the bean plants and positively propel them along the aprons. These operative stretches of the gathering chains 181 travel upwardly and rearwardly and are synchronized with the rate of travel of the tractor so as, in effect, to remain stationary and not pull the bean plants from the ground nor retard their progress along the gathering aprons 160.

The gathering chains 181 continue to hold the bean plants during their rearward movement between the corresponding pair of gathering aprons 160, and deliver the bean plants under the forward stationary end disk 121 of the corresponding picking mechanism 119 and into the space (FIG. 8) between the lower edge of the corresponding cover or enclosing plate 145 and the adjacent mold board 151. On moving into this space, the bean plants enter the zone of action of the picking tines 127, which are rotating about the axis of the corresponding picker shaft 114 in the direction of the arrows associated with FIG. 8. With such movement of the picking tines 127, it will be seen that the bean plants, while being picked, are bent laterally over the mold board 151. The comb-like grill formed by the arcuate bars 139, serves to clean trash from the picking tines 127.

The picking tines 127 move upward within the bean plants, strike the stems which connect the pods with the bean plants, and operate to sever the bean pods and fling them onto the surface of the stretch of the conveyor 61, which serves both of the picking mechanisms 119. In the event that a picking tine 127 encounters excessive resistance in so combing the bean plants, the picking tines are capable of yielding due to their helical spring sections 128, as above described. The bean pods, together with the leaves and other material necessarily separated from the bean plants, are carried by the horizontal stretch of conveyor 61 to the elevator stretch and thence to a winnowing and bagging mechanism (not shown).

At different times, it is necessary to adjust the front end of the harvester frame. To effect such adjustment, the operator moves the hydraulic control lever L' (FIG. 1) to swing the levers 14 in one direction or the other. On swinging clockwise, as viewed in FIG. 1, these levers 14 through the push rods 50, operate to swing the triangular plates 45 clockwise about their pivots 46, and, through the links 44, to lift the front end of the harvester frame.

It is also desirable to be able to adjust the rear end of the harvester frame so as to adjust the height of the rear ends of the picking mechanisms 119. To effect such adjustment, the operator moves the hydraulic control lever L (FIG. 1) to swing the levers 13 in one direction or the other. On swinging clockwise, as viewed in FIG. 1, the levers 13, through the chains 21, swing the bell crank levers 19 clockwise and thereby elevate the rear end of the harvester frame.

The important feature of the invention resides in its ability to thresh dry bean pods and bean seeds from ripe plants standing in the field. In handling such ripe plants the ripe pods are conditioned to burst open on anything approaching rough handling and frequently burst open on being struck by the tines 127 when these tines strike the pods in their function of separating the pods from the plants. When the tines strike the plants so as to sever the pods intact from the vines, the pods are tossed directly onto the top horizontally moving stretch of the conveyor belt 61 to be conducted away but when the pods are struck to release their contained bean seeds, the bean seeds fly in all directions. The brushes 131, 131a behind alternate longitudinal rows of tines 127 are remarkably effective in confining the movement of such released bean seeds and in guiding them onto the conveyer belt 61. Thus the seeds from any pods bursting under impact of the tines 127 in the region of or following the curved face 154 of the mold board 151 are effectively confined in their movement between the brush 131 or 131a in advance of the bursting pod and the brush 131 or 131a behind the bursting pod, and between the action of gravity and the propelling action of the brush 131 or 131a, behind the bursting pod are effectively guided onto the top horizontal stretch of the conveyor 61. Such bean seeds released by impact to fly to the other side of the harvester are for the most part caught by the brushes 131, 131a of the picking mechanism 119 on the opposite side of the machine and returned to the conveyor belt 61.

It will be seen that these brushes essentially act in the capacity of flexible baffles mounted on the reel and arranged among and in the path of movement of the picking fingers 127 to baffle the escape of released flying bean seeds, the bristles of the brushes used, however, permitting their bristles to be combed, along with the picking fingers 127, by the arcuate bars 139 without interference with the action of these arcuate bars in removing plant stems or the like from the picking fingers.

The frusto-conical form of the ends of the bristles 132a of the brushes 131a at the trailing end of each of the picking mechanisms 119 has also been found to be an important factor in obtaining maximum recovery of both pods and released bean seeds. By reason of this frusto-conical form, the brushes 131a at the trailing ends of the picking mechanisms 119 sweep close to and parallel to the ground and serve to sweep pods and bean seeds onto the top horizontal stretch of the conveyer belt which otherwise would be lost. By reason of such conical form, the brushes 131a at the trailing ends of the picking mechanisms 119 sweep close to and parallel to the ground and serve to sweep pods and bean seeds onto the top horizontal stretch of the conveyer belt which otherwise would be lost. The utility of such brushes 131a of frusto-conical form at the trailing end of each bean picking mechanism is not confined to harvesting ripe or dry beans but can also advantageously be used in harvesting string beans.

From the foregoing it will be seen that the present invention provides a sturdy and reliable harvester, particularly for harvesting dry or ripe bean pods and seeds, which obtains high yield from ripe bean plants in the field with minimum loss of the ripe bean seeds and operates rapidly and effectively to harvest the dry beans in pod or seed form. It will further be seen that the present invention accomplishes the objects and has the advantages heretofore enumerated.

I claim:

1. In a ripe bean harvester having a frame adapted to be propelled along a row of mature bean plants in the field, the ripe pods of such mature bean plants being conditioned to burst open on any approach to rough handling, a threshing reel journalled on said frame to rotate about an axis arranged above and extending longitudinally of said row, picking fingers projecting radially from said reel to engage and comb said bean plants in said row, means rotating said reel to effect upward movement of said picking fingers through said plants, a horizontal mold board arranged alongside said row of bean plants and against which said plants are bent over by said picking fingers, a semicylindrical cover concentric with and enclosing the side of said reel opposite from said mold board, and a generally horizontal conveyer arranged along the side of said mold board opposite from said reel to receive the bean pods, bean seeds, leaves and stems removed from said bean plants by said picking fingers; the combination therewith of means retarding the escape of dry bean seeds released from the pods by the bursting of said pods by said picking fingers, comprising a series of brushes mounted on said reel in circumferential alternation with said fingers with their bristles projecting radially outwardly with respect to said reel a distance at least substantially equal to the length of said picking fingers and with their ends in closely spaced relation to said semicylindrical cover and said mold board and said brushes extending axially along said reel and being arranged at spaced intervals circumferentially around said reel with their bristles interspersed among and in the path of movement of said picking fingers, whereby the dry bean seeds released by said picking fingers in the region of said mold board are confined to said region by the mold board and the bristles in advance of and following the picking fingers releasing the bean pods in said region and are guided by said advance and following brushes over said mold board onto said conveyer.

2. In a ripe bean harvester having a frame adapted to be propelled along a row of mature bean plants in the field, the ripe pods of such mature bean plants being conditioned to burst open on any approach to rough handling, a threshing reel journalled on said frame to rotate about an axis arranged above and extending longitudinally of said row, picking fingers projecting radially from said reel to engage and comb said bean plants in said row, means rotating said reel to effect upward movement of said picking fingers through said plants, a horizontal mold board arranged alongside said row of bean plants and against which said plants are bent over by said picking fingers, a semicylindrical cover concentric with and enclosing the side of said reel opposite from said mold board, and a generally horizontal conveyer arranged along the side of said mold board opposite from said reel to receive the bean pods, bean seeds, leaves and stems removed from said bean plants by said picking fingers; the combination therewith of means retarding the escape of dry bean seeds released from the pods by the bursting of said pods by said picking fingers, comprising a series of brushes each having a back extending substantially the full length of the reel and having a row of bristles projecting from said back radially outwardly with respect to said reel a distance at least substantially equal to the length of said picking fingers and with their ends in closely spaced relation to said semicylindrical cover and said mold board, said brushes being arranged at circumferentially spaced intervals around said reel in circumferential alternation with said fingers with their bristles interspersed among and in the path of movement of said picking fingers, whereby the dry bean seeds released by said picking fingers in the region of said mold board are confined to said region by the mold board and the bristles in advance of and following the picking fingers releasing the bean pods in said region and are guided by said advance and following brushes over said mold board onto said conveyer.

References Cited in the file of this patent

UNITED STATES PATENTS

| | | |
|---|---|---|
| 2,587,553 | Ward | Feb. 26, 1952 |
| 2,656,667 | Smith et al. | Oct. 27, 1953 |
| 2,675,663 | Ward | Apr. 20, 1954 |
| 2,853,845 | Smith | Sept. 30, 1958 |
| 2,938,325 | Chase | May 31, 1960 |